(12) United States Patent
Sekine et al.

(10) Patent No.: US 10,311,497 B2
(45) Date of Patent: Jun. 4, 2019

(54) SERVER, ANALYSIS METHOD AND COMPUTER PROGRAM PRODUCT FOR ANALYZING RECOGNITION INFORMATION AND COMBINATION INFORMATION

(71) Applicant: KABUSHIKI KAISHA TOSHIBA, Minato-ku, Tokyo (JP)

(72) Inventors: Masahiro Sekine, Tokyo (JP); Masashi Nishiyama, Kanagawa (JP); Kaoru Sugita, Saitama (JP); Hidetaka Ohira, Kanagawa (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 15/332,651

(22) Filed: Oct. 24, 2016

(65) Prior Publication Data

US 2017/0039620 A1    Feb. 9, 2017

Related U.S. Application Data

(62) Division of application No. 14/065,670, filed on Oct. 29, 2013, now abandoned.

(30) Foreign Application Priority Data

Nov. 5, 2012  (JP) ................................ 2012-243762

(51) Int. Cl.
*G06Q 30/06* (2012.01)
*G06Q 30/02* (2012.01)

(52) U.S. Cl.
CPC ..... *G06Q 30/0623* (2013.01); *G06Q 30/0251* (2013.01); *G06Q 30/0255* (2013.01);
(Continued)

(58) Field of Classification Search
CPC ................ G06Q 30/02–0277; G06Q 30/0631
See application file for complete search history.

(56) References Cited

U.S. PATENT DOCUMENTS

2007/0130020 A1* 6/2007 Paolini .............. G06Q 10/0637
                                                    705/26.62
2010/0191619 A1* 7/2010 Dicker .................. G06Q 30/02
                                                    705/26.1

(Continued)

FOREIGN PATENT DOCUMENTS

JP    2009-169843    7/2009
JP    2012-108805    6/2012

*Primary Examiner* — Michael W Schmucker
*Assistant Examiner* — Bion A Shelden
(74) *Attorney, Agent, or Firm* — Finnegan, Henderson, Farabow, Garrett & Dunner, L.L.P.

(57) ABSTRACT

According to an embodiment, a server includes a first acquiring unit, a second acquiring unit, an analyzing unit, and an output unit. The first acquiring unit is configured to acquire recognition information includes a product identification information for identifying the product. The second acquiring unit is configured to acquire combination information including the product identification information of the product to be combined with an object image including an object. The analyzing unit is configured to calculate product priorities for respective products by analyzing the recognition information and the combination information. The output unit is configured to output information based on the product priorities.

20 Claims, 11 Drawing Sheets

(52) U.S. Cl.
CPC ..... *G06Q 30/0621* (2013.01); *G06Q 30/0631* (2013.01); *G06Q 30/0643* (2013.01)

(56) References Cited

U.S. PATENT DOCUMENTS

| | | |
|---|---|---|
| 2013/0033591 A1 | 2/2013 | Takahashi et al. |
| 2013/0179303 A1* | 7/2013 | Petrou .................... G06Q 30/06 705/26.61 |
| 2014/0176565 A1* | 6/2014 | Adeyoola ............. G06T 19/006 345/473 |

* cited by examiner

FIG.5

| NO. | DATE/TIME | PRODUCT IMAGE INFORMATION | CORRESPONDING PRODUCT ID | DISPLAYED RELATED INFORMATION |
|---|---|---|---|---|
| 1 | OCT. 22, 2012 11:32:48 | IMAGE 10392 | PRODUCT 20928 | MAP TO STORE |
| 2 | OCT. 22, 2012 11:46:30 | IMAGE 10736 | PRODUCT 20183 | MAP TO STORE |
| 3 | OCT. 22, 2012 12:02:29 | IMAGE 10192 | PRODUCT 20928 | COORDINATE INFORMATION |
| 4 | OCT. 22, 2012 12:10:00 | IMAGE 10291 | PRODUCT 20029 | PRICE, WORD-OF-MOUTH INFORMATION |
| ... | ... | ... | ... | ... |

FIG.6

| NO. | DATE/TIME | COMBINED IMAGE INFORMATION | PRODUCT ID | CATEGORY |
|---|---|---|---|---|
| 1 | OCT. 22, 2012 14:01:38 | IMAGE 30481 | PRODUCT 20928 | WITH BUTTONS FASTENED |
| 2 | OCT. 22, 2012 14:34:32 | IMAGE 30481 | PRODUCT 20928 | WITH COLLAR UP |
| 3 | OCT. 22, 2012 15:02:01 | IMAGE 30481 | PRODUCT 20349 | HANDBAG STYLE |
| 4 | OCT. 22, 2012 15:21:34 | IMAGE 30481 | PRODUCT 20349 | SHOULDER BAG STYLE |
| ... | ... | ... | ... | ... |

FIG.12

| NO. | DATE/TIME | PRODUCT ID |
|---|---|---|
| 1 | OCT. 22, 2012 15:36:32 | PRODUCT 20928 |
| 2 | OCT. 22, 2012 15:37:21 | PRODUCT 20349 |
| 3 | OCT. 22, 2012 15:51:35 | PRODUCT 20290 |
| ... | ... | ... |

FIG.13

| NO. | ADVERTISEMENT ID | IMAGE ID | NUMBER OF ADVERTISEMENTS |
|---|---|---|---|
| 1 | ADVERTISEMENT A | IMAGE 10392 | 50 |
| 2 | ADVERTISEMENT B | IMAGE 10291 | 60 |
| 3 | ADVERTISEMENT C | IMAGE 10192 | 40 |
| ... | ... | ... | ... |

FIG.14

| NO. | ADVERTISEMENT ID | IMAGE ID | NUMBER OF ADVERTISEMENTS |
|---|---|---|---|
| 1 | ADVERTISEMENT A | IMAGE 10392 | 60 |
| 2 | ADVERTISEMENT B | IMAGE 10291 | 40 |
| 3 | ADVERTISEMENT C | IMAGE 10192 | 50 |
| ... | ... | ... | ... |

FIG.15

| NO. | SHELF ID | PRODUCT ID |
|---|---|---|
| 1 | SHELF A | PRODUCT 20928 |
| 2 | SHELF B | PRODUCT 20660 |
| 3 | SHELF C | PRODUCT 20290 |
| ... | ... | ... |

FIG.16

| NO. | SHELF ID | PRODUCT ID |
|---|---|---|
| 1 | SHELF A | PRODUCT 20928 |
| 2 | SHELF B | PRODUCT 20290 |
| 3 | SHELF C | PRODUCT 20660 |
| ... | ... | ... |

SERVER, ANALYSIS METHOD AND COMPUTER PROGRAM PRODUCT FOR ANALYZING RECOGNITION INFORMATION AND COMBINATION INFORMATION

CROSS-REFERENCE TO RELATED APPLICATIONS

This is a division of application Ser. No. 14/065,670, filed Oct. 29, 2013, which is based upon and claims the benefit of priority from Japanese Patent Application No. 2012-243762, filed on Nov. 5, 2012; the entire contents of both applications are incorporated herein by reference.

FIELD

Embodiments described herein relate generally to a server, an analysis method, and a computer program product.

BACKGROUND

In retail industry for general consumers, there are recently increasing attempts to differentiate shopping styles by creating new user qualities, and O2O (Online to Offline), for example, is attracting attention. The O2O means interaction of online and offline buying behaviors and influence of online information on buying behavior at brick-and-motor shops or the like, and services such as finding stores using location-based services of portable terminals and coupons available online and usable at brick-and-motor shops have been expanding.

In the meantime, various technologies relating to O2O such as technology for virtual fitting using product images are being developed.

BRIEF DESCRIPTION OF THE DRAWINGS

FIG. 5 is a table illustrating examples of recognition information according to the first embodiment;

FIG. 6 is a table illustrating examples of combination information according to the first embodiment;

FIG. 12 is a table illustrating examples of purchase information according to the second embodiment;

FIG. 13 is a table illustrating examples of first sales promotion information before being updated according to the second embodiment;

FIG. 14 is a table illustrating examples of first sales promotion information after being updated according to the second embodiment;

FIG. 15 is a table illustrating examples of store layout information before being updated according to the second embodiment;

FIG. 16 is a table illustrating examples of store layout information after being updated according to the second embodiment;

DETAILED DESCRIPTION

According to an embodiment, a server includes a first acquiring unit, a recognition information storage unit, a second acquiring unit, a combination information storage unit, an analyzing unit, and an output unit. The first acquiring unit is configured to acquire a piece of recognition information including a piece of product identification information for identifying a product included in a product image. The recognition information storage unit is configured to store the piece of recognition information. The second acquiring unit is configured to acquire a piece of combination information including the piece of product identification information of the product to be combined with an object image including an object. The combination information storage unit is configured to store the piece of combination information. The analyzing unit is configured to calculate product priorities for respective products by analyzing a plurality of pieces of recognition information stored in the recognition information storage unit and a plurality of pieces of combination information stored in the combination information storage unit. The output unit is configured to output information based on the product priorities.

Embodiments will be described in detail below with reference to the accompanying drawings.

First Embodiment

Figure 1:
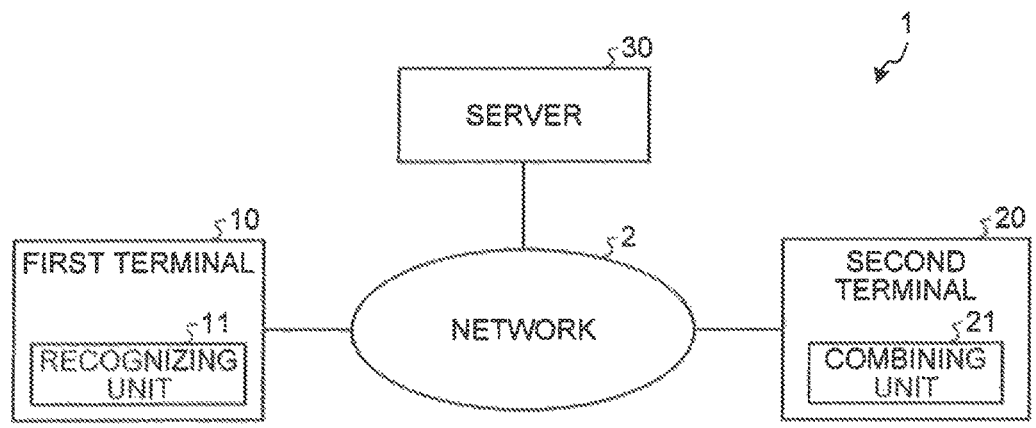
FIG. 1 is a diagram illustrating an example of a system according to a first embodiment.

FIG. 1 is a configuration diagram illustrating an example of a system 1 according to a first embodiment. As illustrated in FIG. 1, the system 1 includes a first terminal 10, a second terminal 20, and a server 30. The first terminal 10, the second terminal 20 and the server 30 are connected via a network 2. The network 2 can be realized by the Internet or a local area network (LAN), for example.

In the first embodiment, an example in which the first terminal 10 is an image recognition terminal that includes a recognizing unit 11 and that acquires related information on a real object of interest to the user by being held over the real object will be described. The first terminal 10 can be realized by a portable terminal, for example. In the following, to acquire related information on a real object by focus the first terminal 10 over the real object may be referred to as "focus".

Similarly, in the first embodiment, an example in which the second terminal 20 is an image combining terminal that includes a combining unit 21 and that performs virtual fitting simulation, virtual installation simulation and the like will be described. The second terminal 20 is installed in a store selling products, for example. In the following, to experience a product of interest to the user through virtual fitting simulation, virtual installation simulation or the like may be referred to as "try".

With the system 1, it is assumed that the user holds the first terminal 10 over a real object of interest to acquire related information on the product and that, starting from the acquired related information, the user is encouraged to go to the store in which the second terminal 20 is installed and to experience the product through virtual fitting simulation or virtual installation simulation, which is linked to purchase of the product.

Figure 2:
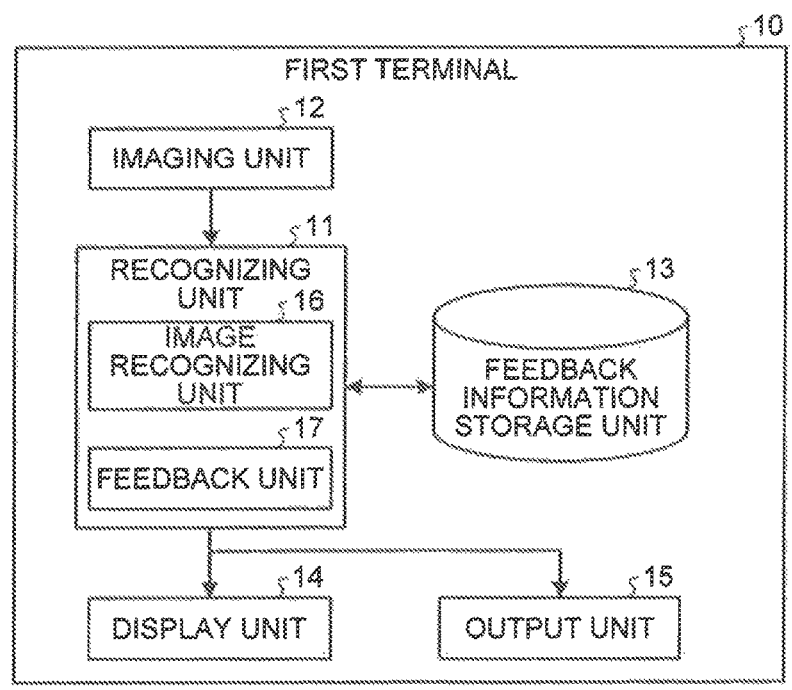
FIG. 2 is a diagram illustrating an example of a first terminal according to the first embodiment.

FIG. 2 is a configuration diagram illustrating an example of the first terminal 10 according to the first embodiment. As illustrated in FIG. 2, the first terminal 10 includes a recognizing unit 11, an imaging unit 12, a feedback information storage unit 13, a display unit 14, and an output unit 15.

The recognizing unit 11 may be implemented by making a processor such as a central processing unit (CPU) execute a program, that is, by software, may be implemented by hardware such as an integrated circuit (IC), or may be implemented by combination of software and hardware, for example. The imaging unit 12 can be realized by an imager such as a digital camera, for example. The feedback information storage unit 13 can be realized by a storage device that can magnetically, optically or electrically store information such as a hard disk drive (HDD), a solid state drive (SSD), a memory card, an optical disk, or a random access memory (RAM), for example. The display unit 14 can be realized by a display device such as a liquid crystal display or a touch panel display, for example. The output unit 15 can be realized by a communication device such as a network interface card (NIC), for example.

The imaging unit 12 images a real object of interest to the user to generate a product image. Examples of the real object of interest to the user include an advertisement of a product of interest to the user, but the real object may be a product itself of interest to the user.

The feedback information storage unit 13 stores feedback information. Details of the feedback information will be described later.

The recognizing unit 11 includes an image recognizing unit 16 and a feedback unit 17.

The image recognizing unit 16 recognizes a product image, estimates a product included in the product image, and selects at least any one of a plurality of kinds of related information on the product. Specifically, the image recognizing unit 16 acquires product information on the estimated, product from the server 30 and selects at least any one of a plurality of kinds of related information contained in the acquired, product information. The product information acquired by the image recognizing unit 16 contains a product ID (an example of product identification information) of the estimated product and a plurality of kinds of related information. Examples of the kinds of related information include attribute information and accompanying information of the estimated product. Examples of the attribute information include brand, price, color, and material, and examples of the accompanying information include word of mouth, recommended coordinates and store information (address, map, etc.).

When feedback information of the estimated product is stored in the feedback information storage unit 13, the image recognizing unit 16 selects related information according to the feedback information.

The feedback unit 17 stores feedback information based on information transmitted from the server 30 in the feedback information storage unit 13.

The display unit 14 displays the related information selected by the image recognizing unit 16. The display unit 14 displays word of mouth, recommended coordinates, store information or the like of the product estimated by the image recognizing unit 16 as an image, for example.

The output unit 15 outputs the recognition information to the server 30. The recognition information at least contains a product ID of the product estimated by the image recognizing unit 16. The recognition information may contain product image information and related information of the product image. The product image information may be the product image itself or may be an image matched with the product image in image recognition performed by the image recognizing unit 16 or an image ID of the image. The recognition information may contain the date and time of recognition, the position of recognition, a user ID of the user, and the like.

Figure 3:
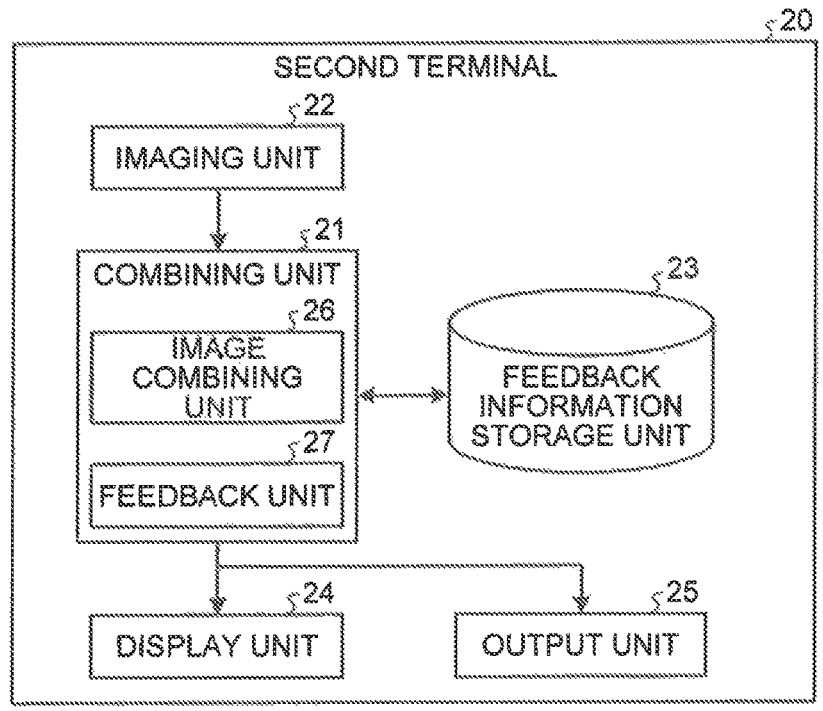
FIG. 3 is a diagram illustrating an example of a second terminal according to the first embodiment.

FIG. 3 is a configuration diagram illustrating an example of the second terminal 20 according to the first embodiment. As illustrated in FIG. 3, the second terminal 20 includes a combining unit 21, an imaging unit 22, a feedback information storage unit 23, a display unit 24, and an output unit 25.

The combining unit 21 may be implemented by making a processor such as a central processing unit (CPU) execute a program, that is, by software, may be implemented by hardware such as an IC, or may be implemented by combination of software and hardware, for example. The imaging unit 22 can be realized by an imager such as a digital camera, for example. The feedback information storage unit 23 can be realized by a storage device that can magnetically, optically or electrically store information such as an HDD, an SSD, a memory card, an optical disk, or a RAM, for example. The display unit 24 can be realized by a display device such as a liquid crystal display or a touch panel display, for example. The output unit 25 can be realized by a communication device such as an NIC, for example.

The imaging unit 22 images an object to be combined to generate an image to be combined. Examples of the object to be combined include the user.

The feedback information storage unit 23 stores feedback information. Details of the feedback information will be described later.

The combining unit 21 includes an image combining unit 26 and a feedback unit 27.

The image combining unit 26 combines the image to be combined generated by the imaging unit 22 and an image for combination of a product (such as clothes). Specifically, the image combining unit 26 acquires product information of a plurality of products from the server 30, displays images for combination contained in the acquired product information on the display unit 24, and combines an image for combination selected by the user with the image to be combined generated by the imaging unit 22. The product information acquired by the image combining unit 26 contains product IDs (an example of product identification information) of the products and a group of images for combination. Since the images for combination are present for each category of products, the images for combination are in a form of groups. The category may be the kind or the use of products or the state in which products are tried on.

When feedback information is stored in the feedback information storage unit 23, the image combining unit 26 displays the images for combination on the display unit 24 in a manner that the user can preferentially select an image for combination indicated by the feedback information.

The feedback unit 27 stores feedback information based on information transmitted from the server 30 in the feedback information storage unit 23.

The display unit 24 displays images for combination to be selected by the user and combined images obtained by combination by the image combining unit 26.

The output unit 25 outputs combination information to the server 30. The combination information at least contains a product ID of the product estimated by the image combining unit 26. The combination information may contain combined image information of an image to be combined and combination image information of an image for combination. The combined image information may be the image to be combined itself or may contain depth information obtained by sensing the image to be combined, skeleton information indicating the outline of a person, and measurement information such as height, weight, chest circumference, sitting height and the like in addition to the image to be combined. The combination image information may be the image for combination itself or may be an image ID of the image for combination. The combination information may contain the date and time of combination, the position of combination, a user ID of the user, the category of the product and the like.

Figure 4:
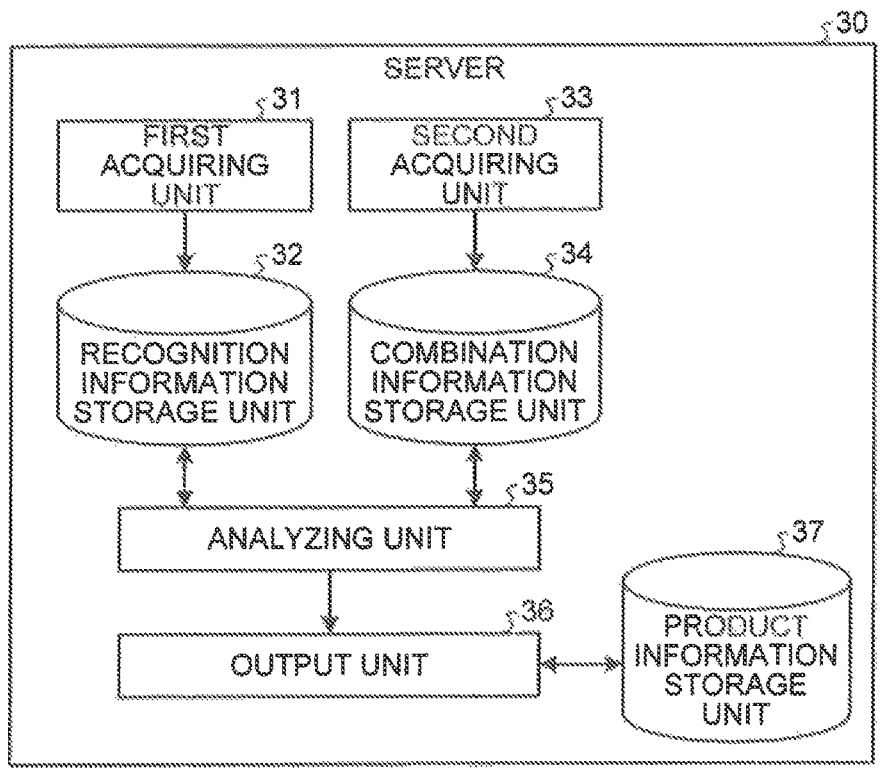
FIG. 4 is a diagram illustrating an example of a server according to the first embodiment.

FIG. 4 is a configuration diagram illustrating an example of the server 30 according to the first embodiment. As illustrated in FIG. 4, the server 30 includes a first acquiring unit 31, a recognition information storage unit 32, a second acquiring unit 33, a combination information storage unit 34, an analyzing unit 35, an output unit 36, and a product information storage unit 37.

The first acquiring unit 31, the second acquiring unit 33 and the analyzing unit 35 may be implemented by making a processor such as a central processing unit (CPU) execute a program, that is, by software, may be implemented by hardware such as an integrated circuit (IC), or may be implemented by combination of software and hardware, for example. The recognition information storage unit 32, the combination information storage unit 34, and the product information storage unit 37 can be realized by a storage device that can magnetically, optically or electrically store information such as an HDD, an SSD, a memory card, an optical disk, or a RAH, for example. The output unit 36 can be realized by a communication device such as an NIC, for example.

The first acquiring unit 31 acquires recognition information including at least the product ID of the product estimated by the recognizing unit 11 from the recognizing unit 11 (the output unit 15), and stores the acquired recognition information in the recognition information storage unit 32. The recognition information may further contain, information as mentioned in the description of the output unit 15.

The recognition information storage unit 32 stores a plurality of pieces of recognition information stored by the first acquiring unit 31. FIG. 5 is a table illustrating examples of the recognition information according to the first embodiment. In the examples illustrated in FIG. 5, the recognition information is information in which a number, the date and time of recognition, the product image information, a product ID, and the related information displayed at the first terminal 10 are associated, but the recognition. information is not limited thereto.

The second acquiring unit 33 acquires combination information including at least the product ID of the product in the image for combination combined with the image to be combined from, the combining unit 21 (the output unit 25), and stores the acquired combination information in the combination information storage unit 34. The combination information may further contain information as mentioned in the description of the output unit 25.

The combination information storage unit 34 stores a plurality of pieces of combination information stored by the second acquiring unit 33. FIG. 6 is a table illustrating examples of the combination information according to the first embodiment. In the examples illustrated in FIG. 6, the combination information is information in which the number, the date and time of combination, the combined image information, the product ID and the category are associated, but the combination information is not limited thereto.

The analyzing unit 35 analyzes a plurality of pieces of recognition information stored in the recognition information storage unit 32 and a plurality of pieces of combination information stored in the combination information storage unit 34, and calculates product priority of each product. Specifically, the analyzing unit 35 analyzes the pieces of recognition information to calculate first product priority of each, product, analyzes the pieces of combination information to calculate second product priority of each product, and calculate the product priority of each product on the basis of the first product priority and the second product priority of each product.

For example, the analyzing unit 35 calculates the product priority E of a certain product by calculating the first product priority Er and the second product priority Es of the product and calculating weighted addition of the calculated first product priority Er and second product priority Es as expressed by Equation (1). if the product ID of the product for which the first product priority Er is calculated is not present in the pieces of combination information, the second product priority Es of the product is obviously 0, and if the product ID of the product for which the second priority Es is calculated is not present in the pieces of recognition information, the first product priority Er of the product is obviously 0.

$$E = wr \times Er + ws \times Es \tag{1}$$

In Equation (1), wr represents the weight of the priority Er and ws represents the weight of the priority Es. Note that the analyzing unit 35 analyzes the pieces of recognition information and sets the first product priority Er of the product represented by a product ID associated with recognition date and time to be higher as the recognition date and time is closer to the current date and time. That is, the analyzing unit 35 sets the first product priority Er to be higher for a product over which a terminal was held on the date and time closer to the current date and time.

The analyzing unit 35 also analyzes the pieces of recognition information and sets the first product priority Er to be higher for a product represented by a product ID having a value whose number of occurrences is larger. That is, the analyzing unit 35 sets the first product priority Er to be higher for a product over which a terminal was held a larger number of times.

Similarly, the analyzing unit 35 analyzes the pieces of combination information and sets the second product priority Es of a product represented by a product ID associated with combination date and time contained in the combination information to be higher as the combination date and time is closer to the current date and time. That is, the analyzing unit 35 sets the second product priority Es to be higher for a product that was tried on the date and time closer to the current date and time.

The analyzing unit 35 also analyzes the pieces of combination information and sets the second product priority Es to be higher for a product represented by a product ID having a value whose number of occurrences is larger. That is, the analyzing unit 35 sets the second product priority Es to be higher for a product that was tried a larger number of times.

The analyzing unit 35 further analyzes whether or not combination information including a product ID of a product whose product priority E satisfies a first predetermined condition exists in the pieces of combination information, and generates first recommendation information recommending related information according to the analysis result among a plurality of kinds of related information. The first predetermined condition may be a threshold or may be the product priorities E from the highest priority to a certain predetermined rank of priority.

For example, if combination information including a product ID of a product whose product priority E satisfies the first predetermined condition does not exist in the pieces of combination information, the analyzing unit 35 generates first recommendation information recommending store information among a plurality of kinds of related information. In this case, since "focus" is performed but "try" is not performed, it is possible to encourage the user to perform "try" by recommending the store information of the store in which the second terminal 20 is installed, and as a result, it may be possible to motivate the user to buy the product.

If, for example, combination information including a product ID of a product whose product priority E satisfies the first predetermined condition exists in the pieces of combination information, the analyzing unit 35 generates first recommendation information recommending recommended coordinates among a plurality of kinds of related information. In this case, since both "focus" and "try" are performed, it may be possible to motivate the user to buy other products recommended in the recommended coordinates by recommending the recommended coordinates.

Furthermore, if there exists a plurality of categories of a product whose product priority satisfies a second predetermined condition, the analyzing unit 35 analyzes the number of occurrences of each of the categories in a plurality of pieces of combination information and generates second recommendation information recommending a category with the largest number of occurrences. The second predetermined condition may be a threshold or may be the product priorities E from the highest priority to a certain predetermined rank of priority.

For example, it is assumed that a product with the product priority E satisfying the second predetermined condition is a bag that can be carried in three ways: a handbag, a shoulder bag, and a backpack. In this case, since the categories of the bag are handbag, shoulder bag and backpack, the analyzing unit 35 analyzes the number of occurrence of each of handbag, shoulder bag and backpack in the pieces of combination information. Then, if the number of occurrences of shoulder bag is the largest, the analyzing unit 35 generates second recommendation information recommending the shoulder bag. In this case, since it is popular among users to perform "try" on the shoulder bag, it may be possible to motivate the user to buy the product by recommending the shoulder bag. If, however, "try" on the shoulder bag style of the bag is already performed, second recommendation information recommending another category such as handbag or backpack on which "try" has not been performed may be generated.

The output unit 36 outputs information regarding a product based on the product priority calculated by the analyzing unit 35 to at least one of the recognizing unit 11 and the combining unit 21. The information based on the product priority may be the product priority itself or may be related information or an image for combination of the product with the product priority. The related information and the image for combination can be obtained from the product information storage unit 37.

The output unit 36 also outputs information based on the product priority calculated by the analyzing unit 35 and the first recommendation information generated by the analyzing unit 35 to the recognizing unit 11. The information based on the product priority and the first recommendation information may be information indicating the product priority and recommended related information or may be recommended related information on the product with the product priority.

The output unit 36 also outputs information based on the product priority calculated by the analyzing unit 35 and the second recommendation information generated by the analyzing unit 35 to the combining unit 21. The information based on the product priority and the second recommendation information may be the product priority and an image ID of a recommended image for combination or may be a recommended image for combination of the product with the product priority.

The information output by the output unit 36 in this manner is used as feedback information at the recognizing unit 11 and the combining unit 21, so that information with higher probability of motivating the user to buy a product is preferentially displayed at the first terminal 10 and the second terminal 20.

When it is requested by the image recognizing unit 16 to acquire product information, the output unit 36 acquires the requested product information from the product information storage unit 37 and outputs the acquired product information to the image recognizing unit 16. Similarly, when it is requested by the image combining unit 26 to acquire product information, the output unit 36 acquires the requested product information from the product information storage unit 37 and outputs the acquired product information to the image combining unit 26.

Figure 7:
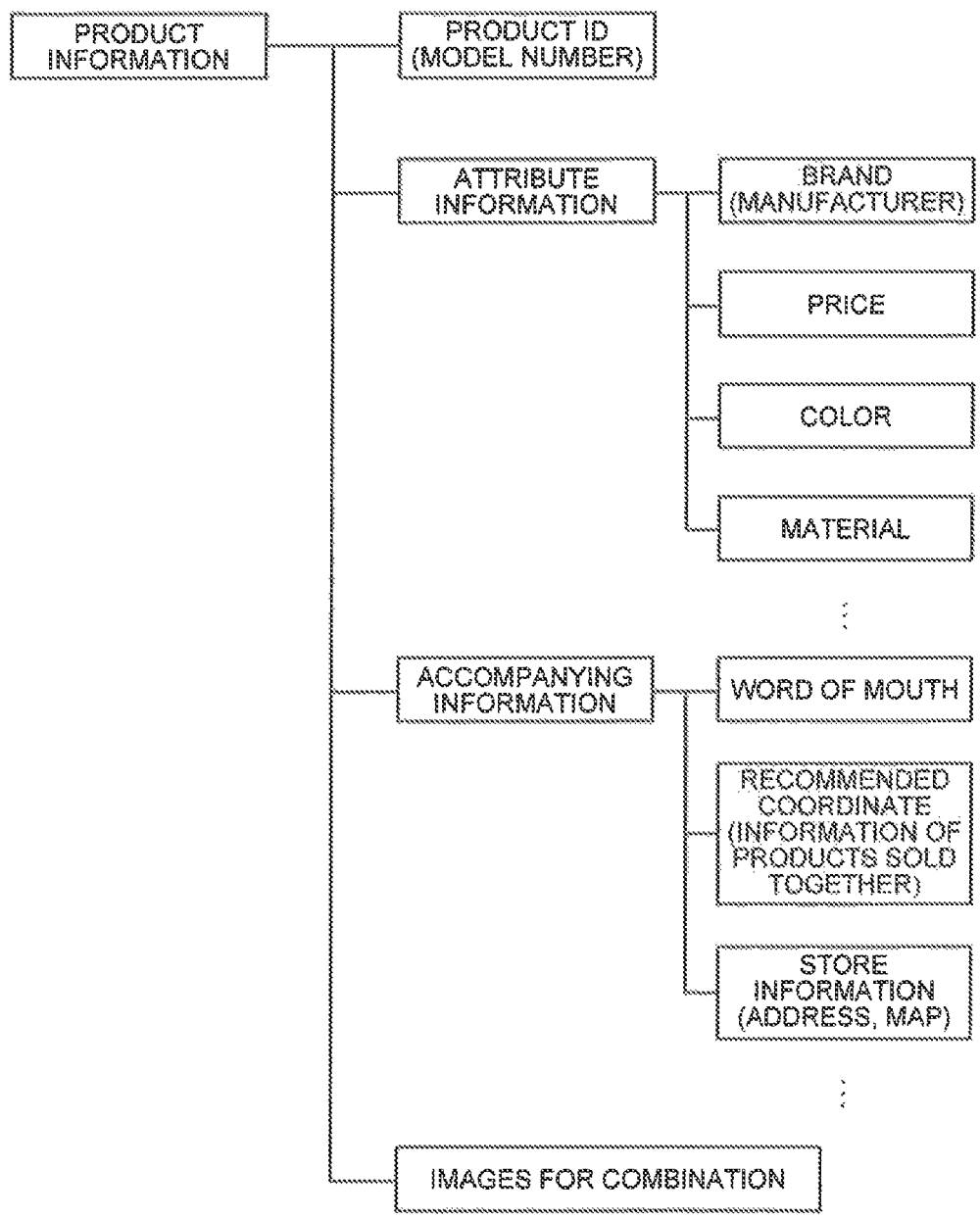
FIG. 7 is a diagram illustrating an example of a data structure of product information according to the first embodiment.

The product information storage unit 37 stores product information of products. FIG. 7 is a diagram illustrating an example of a data structure of the product information according to the first embodiment. In the example illustrated in FIG. 7, the product information is information in which a product ID, attribute information (brand, price, color, material, etc.), accompanying information (word of mouth, recommended coordinates, store information (address, map, etc.), etc.) and a group of images for combination are associated, but the product information is not limited thereto.

Figure 8:
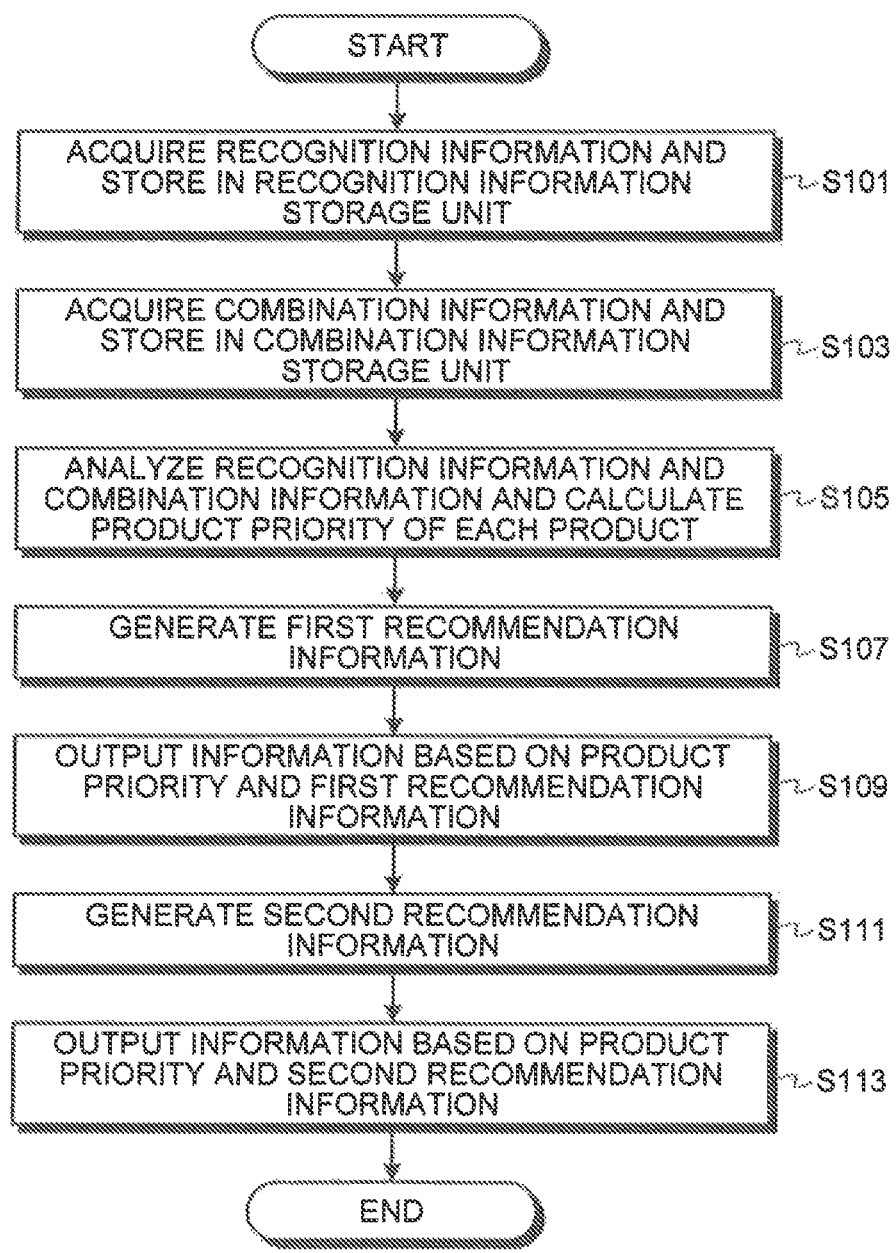
FIG. 8 is a flowchart illustrating an example of processing according to the first embodiment.

FIG. 8 is a flowchart illustrating an example of a flow of procedures of processing performed by the server 30 according to the first embodiment.

First, the first acquiring unit 31 acquires recognition information including at least a product ID of a product estimated by the recognizing unit 11 from the recognizing unit 11 (the output unit 15), and stores the acquired recognition information in the recognition information storage unit 32 (step S101).

Subsequently, the second acquiring unit 33 acquires combination information including at least a product ID of a product in an image for combination combined with an image to be combined from the combining unit 21 (the output unit 25), and stores the acquired combination information in the combination information storage unit 34 (step S103).

Subsequently, the analyzing unit 35 analyzes a plurality of pieces of recognition information, stored in the recognition information storage unit 32 to calculate first product priority of each product, analyses a plurality of pieces of combination information stored in the combination information storage unit 34 to calculate second product priority of each product, and calculates product priority of each product on the basis of the first product priority and the second product priority of each product (step S105).

Subsequently, the analyzing unit 35 further analyzes whether or not combination information including a product ID of a product whose product priority satisfies the first predetermined condition exists in the pieces of combination information, and generates first recommendation information recommending related information according to the analysis result among a plurality of kinds of related information (step S107).

Subsequently, the output unit 36 outputs information based on the product priority calculated by the analyzing unit 35 and the first recommendation information generated by the analyzing unit 35 to the recognizing unit 11 (step S109). Subsequently, if there exists a plurality of categories of a product whose product priority satisfies the second predetermined condition, the analyzing unit 35 analyzes the number of occurrences of each of the categories in the pieces of combination, information and generates second recommendation information recommending a category with the largest number of occurrences (step S111).

Subsequently, the output unit 36 outputs information based on the product priority calculated by the analyzing unit 35 and the second recommendation information generated by the analyzing unit 35 to the combining unit 21 (step S113).

As described above, according to the first embodiment, since the product priority taking history of various O2O related technologies into consideration can be calculated by analyzing the history of the recognition information, and the history of the combination information to calculate the product priority, products of greater interest to the user can be extracted. In addition, according to the first embodiment, since information based on the calculated product priority is output to the recognizing unit and the combining unit, the recognizing unit and the combining unit can preferentially present products of greater interest to the user by using the information and it is thus possible to increase the probability of motivating the user to buy a product.

In particular, according to the first embodiment, since not only information on a product of higher interest to the user but also information with high probability of motivating the user to buy a product can be extracted from a plurality of kinds of related information of the product, the recognizing unit can preferentially present information of greater interest to the user by using the information and it is thus possible to increase the probability of motivating the user to buy a product.

Similarly, according to the first embodiment, since not only information on a product of higher interest to the user but also information with high probability of motivating the user to buy a product can be extracted from the categories of the product, the combining unit can preferentially present information of greater interest to the user by using the information and it is thus possible to increase the probability of motivating the user to buy a product.

According to the first embodiment, since the recognizing unit 11 (the output unit 15) can contain product image information and related information in the recognition information, it is also possible to figure out over what real objects the user held the terminal and what products the user is interested in. For example, it is possible to figure out whether the user got interested in a product X by focus the terminal over an advertisement A or by focus the terminal over an advertisement B, which allows the history through which the user got interested in the product X to be used in the analysis.

Similarly, according to the first embodiment, since the combining unit 21 (the output unit 25) can contain, combined image information and combination image information in the combination information, it is also possible to figure out what image for combination is combined with what image to be combined. For example, it is possible to figure out such a fact that people with a body type A often try on clothes Y or such a fact that people with a body type B often try on clothes Z, and it is thus possible to obtain a tendency of "try" of each user by data analysis.

Second Embodiment

In the second embodiment, an example in which a third terminal including a managing unit that manages sales information on sales of products is further provided will be described. In the following, the difference from the first embodiment will be mainly described and components having similar functions as in the first embodiment will be designated by the same names and reference numerals as in the first embodiment, and the description thereof will not be repeated.

Figure 9:
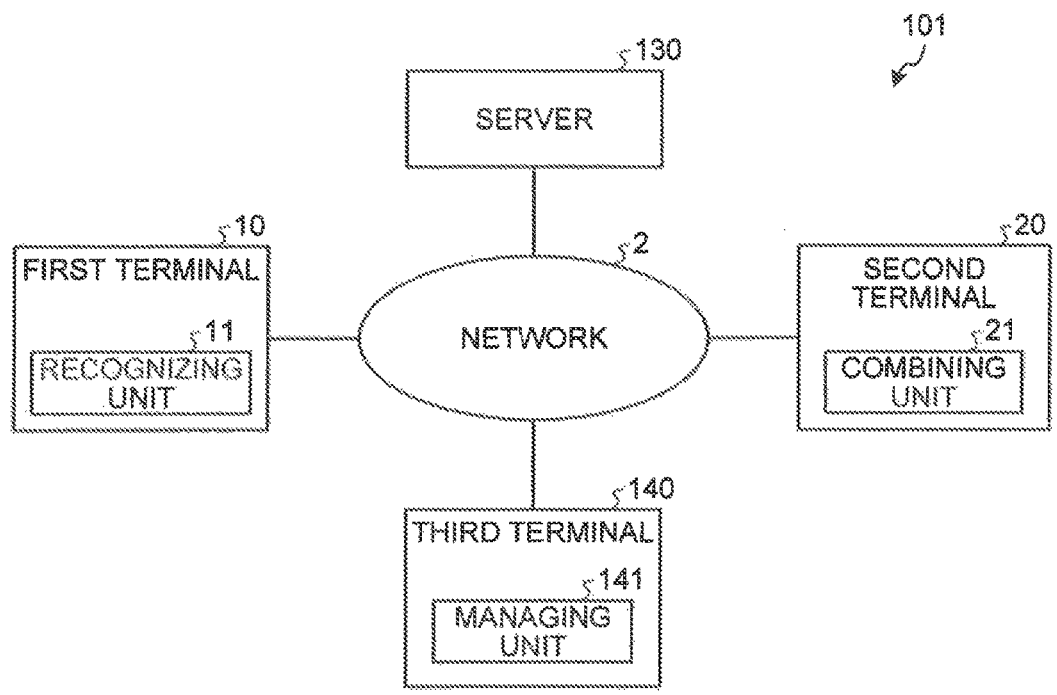
FIG. 9 is a diagram illustrating an example of a system according to a second embodiment.

FIG. 9 is a configuration diagram illustrating an example of a system 101 according to the second embodiment. As illustrated in FIG. 9, the system 101 is different from that in the first embodiment in a server 130 and a third terminal 140 thereof.

In the second embodiment, an example in which, the third terminal 140 is a management terminal that includes a managing unit 141 and that manages sales information related to sales of products will be described.

Figure 10:
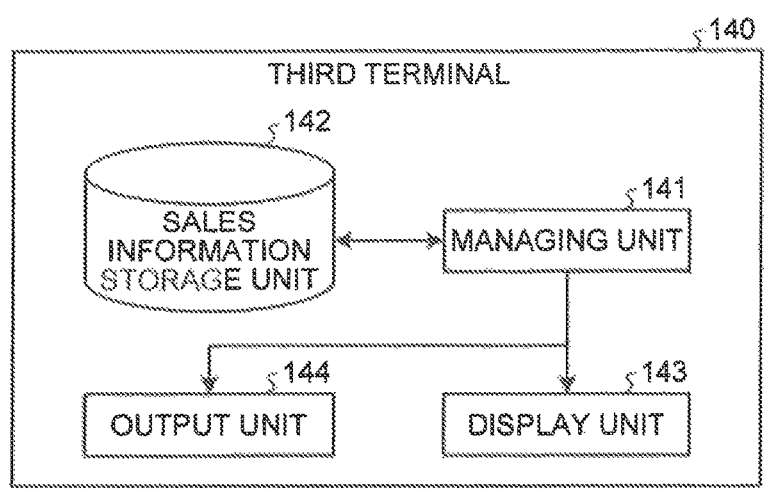
FIG. 10 is a diagram illustrating an example of a third terminal according to the second embodiment.

FIG. 10 is a configuration diagram illustrating an example of the third terminal 140 according to the second embodiment. As illustrated in FIG. 10, the third terminal 140 includes a managing unit 141, a sales information storage unit 142, a display unit 143, and an output unit 144.

The managing unit 141 may be implemented by making a processor such as a CPU execute a program, that is, by software, may be implemented by hardware such as an IC, or may be implemented by combination of software and hardware, for example. The sales information storage unit 142 can be realized by a storage device that can magnetically, optically or electrically store information such as an HDD, an SSD, a memory card, an optical disk, or a RAH, for example. The display unit 143 can be realized by a display device such as a liquid crystal display or a touch panel display, for example. The output unit 144 can be realized by a communication device such as an NIC, for example.

The sales information storage unit 142 stores sales information related to sales of products. Examples of the sales information include purchase information indicating details of purchase of a product, sales promotion information relating to sales promotion of a product, customer information, inventory information, and training information relating to training of store staff. The purchase information contains at least a product ID of a product to be purchased. The purchase information may also contain the date and time of purchase. The sales promotion information contains first sales promotion information relating to sales promotion using product images and second sales promotion information relating to sales promotion using images for combination. Examples of the sales promotion information include information on advertising strategy, store layout, procurement plan, product lineup, and methods for recommending products to customers.

The managing unit 141 manages the sales information stored in the sales information storage unit 142.

The display unit 143 displays the sales information managed by the managing unit 141.

The output unit 144 outputs the sales information to the server 130. For example, the output unit 144 outputs purchase information and sales promotion information to the server 130.

Figure 11:
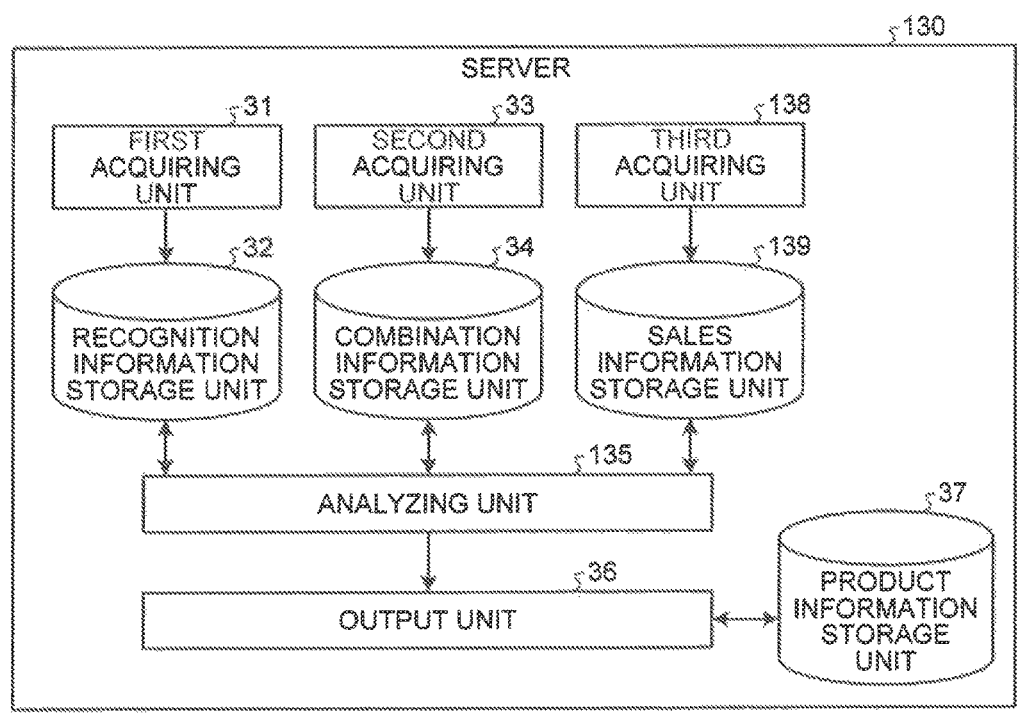
FIG. 11 is a diagram illustrating an example of a server according to the second embodiment.

FIG. 11 is a configuration diagram illustrating an example of the server 130 according to the second embodiment. As illustrated in FIG. 11, the server 130 is different from that in the first embodiment in an analyzing unit 135, a third acquiring unit 138, and a sales information storage unit 139.

The third acquiring unit 138 may be implemented by making a processor such as a CPU execute a program, that is, by software, may be implemented by hardware such as an IC, or may be implemented by combination of software and hardware, for example. The sales information storage unit 139 can be realized by a storage device that can magnetically, optically or electrically store information such as an HDD, an SSD, a memory card, an optical disk, or a RAM, for example.

The third acquiring unit 133 acquires purchase information and sales promotion information including at least a product ID of a product to be purchased from the managing unit 141 (the output unit 144), and stores the acquired purchase information and sales promotion information in the sales information storage unit 139. Mote that the purchase information and the sales promotion information may further contain information mentioned in the description of the sales information storage unit 142.

The sales information storage unit 139 stores a plurality of pieces of purchase information and sales promotion information stored by the third acquiring unit 138. FIG. 12 is a table illustrating examples of the purchase information according to the second embodiment. In the examples illustrated in FIG. 12, the purchase information is information in which a number, the date and time of purchase, and a product ID are associated, but the purchase information is not limited thereto.

The analyzing unit 135 performs at least one of first analysis of analyzing a plurality of pieces of recognition information stored in the recognition information storage unit 32, a plurality of pieces of combination information stored in the combination information storage unit 34, and a plurality of pieces of purchase information stored in the sales information storage unit 139 to calculate the product priority of each product and a second analysis of analyzing at least either a plurality of pieces of recognition information or a plurality of pieces of combination information in addition to a plurality of pieces of purchase information to obtain updated contents of sales information.

First, the first analysis will be described.

The analyzing unit 135 analyzes a plurality of pieces of recognition information to calculate first product priority of each product, analyzes a plurality of pieces of combination information to calculate second product priority of each product, analyzes a plurality of pieces of purchase information to calculate third product priority of each product, calculate the product priority of each product on the basis of the first product priority, the second product priority and the third product priority of each product. For example, the analyzing unit 135 calculates the product priority E of a certain product by calculating the first product priority Er, the second product priority Es and the third product priority Eb of the product and calculating weighted addition of the calculated first product priority Er, second product priority Es and third product priority Eb as expressed by Equation (2).

$$E = wr \times Er + ws \times Es + wb \times Eb \qquad (2)$$

In Equation (2), wb represents the weight of the priority Eb.

Note that the analyzing unit 135 analyzes the pieces of recognition information and sets the first product priority Er of the product represented by a product ID associated with recognition date and time to be higher as the recognition date and time is closer to the current date and time. That is, the analyzing unit 135 sets the first product priority Er to be higher for a product over which a terminal was held on the date and time closer to the current date and time.

The analyzing unit 135 also analyzes the pieces of recognition information and sets the first product priority Er to be higher for a product represented by a product ID having a value whose number of occurrences is larger. That is, the analyzing unit 135 sets the first product priority Er to be higher for a product over which a terminal was held a larger number of times.

Similarly, the analyzing unit 135 analyzes the pieces of combination information and sets the second product priority Es of a product represented by a product ID associated with combination date and time contained in the combination information to be higher as the combination date and time is closer to the current date and time. That is, the analyzing unit 135 sets the second product priority Es to be higher for a product that was tried on the date and time closer to the current date and time.

The analyzing unit 135 also analyzes the pieces of combination information and sets the second product priority Es to be higher for a product represented by a product ID having a value whose number of occurrences is larger. That is, the analyzing unit 135 sets the second product priority Es to be higher for a product that was tried a larger number of times.

Similarly, the analyzing unit 135 analyzes the pieces of purchase information, and sets the third product priority Eb of a product represented by a product ID associated with purchase date and time contained in the purchase information to be higher as the purchase date and time is closer to the current date and time. That is, the analyzing unit 135 sets the third product priority Eb to be higher for a product that, was purchased on the date and time closer to the current date and time.

The analyzing unit 135 also analyzes the pieces of purchase information and sets the third product priority Eb to be higher for a product represented by a product ID having a value whose number of occurrences is larger. That is, the analyzing unit 135 sets the third product priority Eb to be higher for a product that was purchased a larger number of times.

Since the generation of the first recommendation information and the second recommendation information is the same as that in the first embodiment, the description thereof will not be repeated.

Next, the second analysis will be described.

The analyzing unit 135 determines whether or not the behavior of "focus" and the behavior of "try" of the user led to purchase of a product by analyzing at least either a plurality of pieces of recognition information or a plurality of pieces of combination information in addition to a plurality of pieces of purchase information and obtains updated contents of sales promotion information.

Specifically, the analyzing unit 135 analyzes a plurality of pieces of purchase information, analyzes the number of occurrences, in the pieces of recognition information, of product image information associated with a product ID having a value whose number of occurrences in the purchase information satisfies a third predetermined condition, and obtains updated contents of the first sales promotion information according to the number of occurrences of the product image information. The third predetermined condition may be thresholds in multiple steps including an increase determination threshold for determining whether or not to increase a value and a decrease determination threshold for determining whether or not to decrease a value, for example.

FIG. 13 is a table illustrating examples of the first sales promotion information before being updated according to the second embodiment, and FIG. 14 is a table illustrating examples of the first sales promotion information after being updated according to the second embodiment. In the examples illustrated in FIGS. 13 and 14, the first sales promotion information is information in which a number, an advertisement ID, an image ID (product image information) of a product image, and the number of advertisements are associated, but the first sales promotion information is not limited thereto. In the examples illustrated in FIG. 13, it is assumed that the number of occurrences, in the pieces of purchase information, of the value of product ID associated with each of image IDs "IMAGE 10392" and "IMAGE 10192" satisfies the increase determination threshold while the number of occurrences, in the pieces of purchase information, of the value of product ID associated with image ID "IMAGE 10291" satisfies the decrease threshold. It is also assumed that the numbers of occurrences, in the pieces of recognition information, of the image IDs "IMAGE 10392" and "IMAGE 10192" are larger than an average while the number of occurrences of the image ID "IMAGE 10291" is much smaller than the average.

That is, it is found that focus over an advertisement A and an advertisement C led to purchase of products for the products corresponding to the image IDs "IMAGE 10392" and "IMAGE 10192", the effect of the advertisement A and the advertisement C is high, and sales promotion using the advertisement A and the advertisement C is therefore to be enhanced. On the other hand, it is found that focus over an advertisement B had not led to purchase of the product for the product corresponding to the image ID "IMAGE 10291", the effect of the advertisement B is low, and sales promotion using the advertisement B is to be reduced.

In this case, the analyzing unit 135 obtains updated contents in which the numbers of advertisement for the image IDs "IMAGE 10392" and "IMAGE 10192" are increased by 10 while the number of advertisements for the image ID "IMAGE 10291" is decreased by 20, for example, as the updated contents of the first sales promotion information. As a result, it is possible to update the first sales promotion information illustrated in FIG. 13 with that as illustrated in FIG. 14.

The analyzing unit 135 also analyzes the pieces of purchase information, analyzes the number of occurrences, in the pieces of combination information, of combination image information associated with a product ID having a value whose number of occurrences in the purchase information satisfies a fourth predetermined condition, and obtains updated contents of the second sales promotion information according to the number of occurrences of the combination image information. The fourth predetermined condition may be thresholds in multiple steps including an increase determination threshold for determining whether or not to increase a value and a decrease determination threshold for determining whether or not to decrease a value, for example.

The analyzing unit 135 can also obtain updated contents of store layout by analyzing a plurality of pieces of purchase information and determining the sales rate of products sold together. The sales rate of products sold together can be calculated from purchase date and time or the like in the purchase information.

FIG. 15 is a table illustrating examples of the store layout information before being updated according to the second embodiment, and FIG. 16 is a table illustrating examples of the store layout information after being updated according to the second embodiment. In the examples illustrated in FIGS. 15 and 16, the store layout information is information in which a number, a shelf ID, and a product ID are associated, but the store layout information is not limited thereto. It is assumed that a shelf A and a shelf B are adjacent to each other while a shelf C is adjacent to neither of the shelf A and the shelf B. In the examples illustrated in FIG. 15, it is assumed that the sales rates of products sold together of products IDs "PRODUCT 20928" and "PRODUCT 20290" satisfy the increase determination threshold.

That is, since the rate of being sold together is high for the product IDs "PRODUCT 20928" and "PRODUCT 20290", it is found that the sales promotion is to be enhanced by placing these products on adjacent shelves. In this case, the analyzing unit 135 obtains updated contents of arranging the product with the product ID "PRODUCT 20290" on the shelf B and arranging the product with the product ID "PRODUCT 20660" on the shelf C. As a result, it is possible to update the store layout information illustrated in FIG. 15 with that as illustrated in FIG. 16.

The output unit 36 performs at least one of first output of outputting information based on the product priority calculated by the analyzing unit 135 to at least one of the recognizing unit 11 and the combining unit 21 and second output of outputting the updated contents obtained by the analyzing unit 135 to the managing unit 141.

Since the first output is the same as in the first embodiment, the description thereof will not be repeated.

As for the second output, information output by the output unit 36 in this manner is used for update of sales promotion information at the managing unit 141, and sales promotion information with higher probability of motivating the user to buy a product will thus be managed at the third terminal 140.

Figure 17:
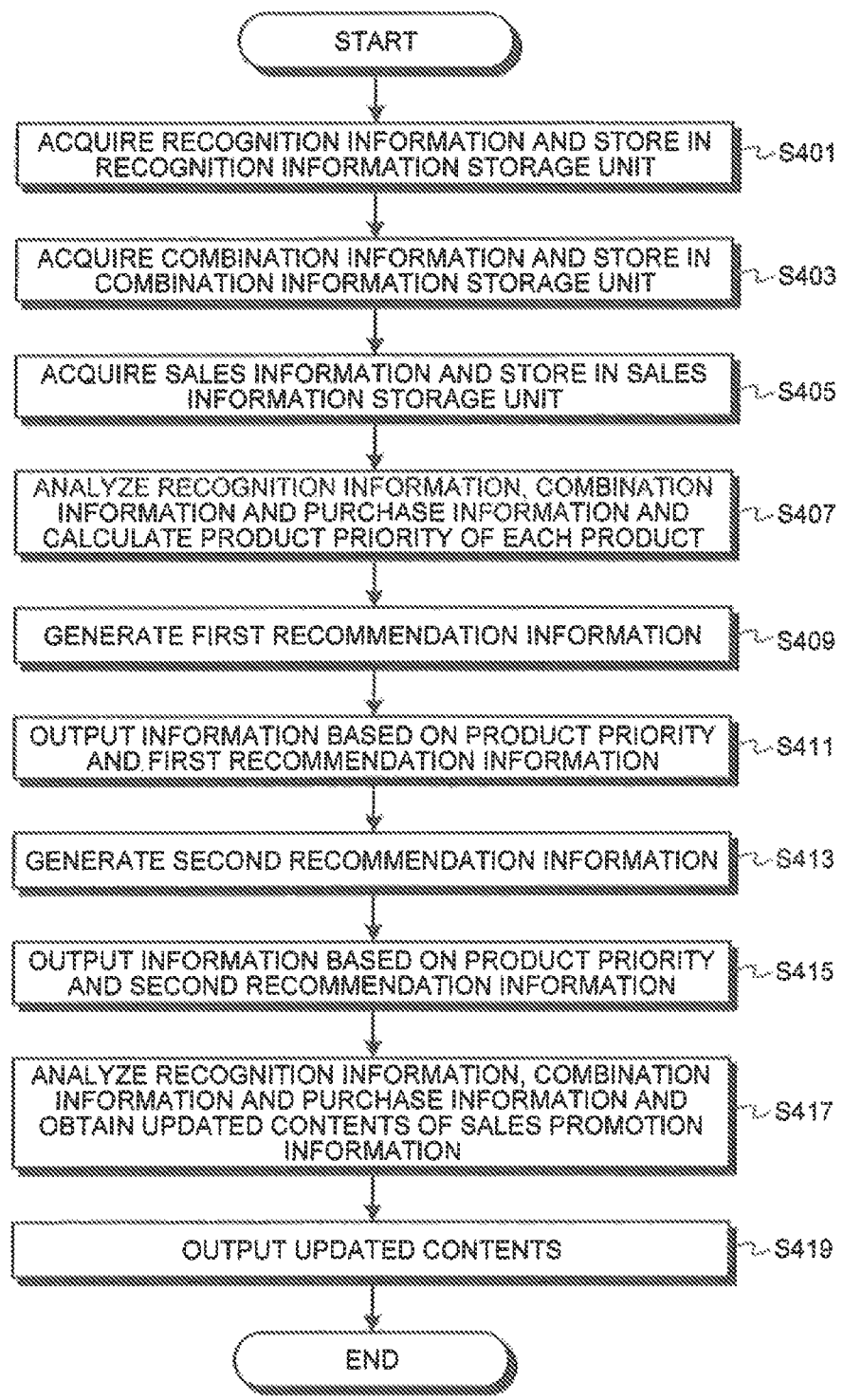
FIG. 17 is a flowchart illustrating an example of processing according to the second embodiment.

FIG. 17 is a flowchart illustrating an example of a flow of procedures of processing performed by the server 130 according to the second embodiment.

First, the first acquiring unit 31 acquires recognition information including at least a product ID of a product estimated by the recognizing unit 11 from the recognizing unit 11 (the output unit 15), and stores the acquired recognition information in the recognition information storage unit 32 (step S401).

Subsequently, the second acquiring unit 33 acquires combination information including at least a product ID of a product in an image for combination combined with an image to be combined from the combining unit 21 (the output unit 25), and stores the acquired combination information in the combination information storage unit 34 (step S403).

Subsequently, the third acquiring unit 133 acquires purchase information and sales promotion information including at least a product ID of a product to be purchased from the managing unit 141 (the output unit 144), and stores the acquired purchase information and sales promotion information in the sales information storage unit 139 (step S405).

Subsequently, the analyzing unit 135 analyzes a plurality of pieces of recognition information stored in the recognition information storage unit 32 to calculate the first product priority of each product, analyzes a plurality of pieces of combination information stored in the combination information storage unit 34 to calculate the second product priority of each product, analyzes a plurality of pieces of purchase information stored in the sales information storage unit 139 to calculate the third product priority of each product, and calculates the product priority of each product on the basis of the first product priority, the second product priority and the third product priority of each product (step S407).

Subsequently, the analyzing unit 135 further analyzes whether or not combination information including a product ID of a product whose product priority satisfies the first predetermined condition exists in the pieces of combination information, and generates first recommendation information recommending related information according to the analysis result among a plurality of kinds of related information (step S409).

Subsequently, the output unit 36 outputs information based on the product priority calculated by the analyzing unit 135 and the first recommendation information generated by the analyzing unit 135 to the recognizing unit 11 (step 3411).

Subsequently, if there exists a plurality of categories of a product whose product priority satisfies the second predetermined condition, the analyzing unit 135 analyzes the number of occurrences of each of the categories in the pieces of combination information and generates second recommendation information recommending a category with the largest number of occurrences (step S413).

Subsequently, the output unit 36 outputs information based on the product priority calculated by the analyzing unit 135 and the second recommendation information generated by the analyzing unit 135 to the combining unit 21 (step S415).

Subsequently, the analyzing unit 135 analyzes at least either of a plurality of pieces of recognition information or a plurality of pieces of combination information in addition to a plurality of pieces of purchase information to obtain updated contents of the sales promotion information (step S417).

Subsequently, the output unit 36 outputs the updated contents of the sales promotion information obtained by the analyzing unit 135 to the managing unit 141 (step S419).

As described above, according to the second embodiment, products of greater interest to the user can be extracted more effectively by further analyzing the purchase information to calculate the product priority. In addition, according to the second embodiment, since information based on the calculated product priority is output to the recognizing unit and the combining unit, the recognizing unit and the combining unit can more preferentially present products of greater interest to the user by using the information and it is thus possible to further increase the probability of motivating the user to buy a product.

Furthermore, according to the second embodiment, more effective sales management can be realized by analyzing at least one of the history of the recognition information and the history of the combination information in addition to the history of the purchase information, which can lead to analysis and improvement of advertising effectiveness, improvement in product lineup, efficiency in product recommendation to customers (improvement in methods for training store staff), improvement in procurement plan, and improvement in store layouts.

Modifications

While examples in which histories of the image recognition terminal that implements "focus", the image combining terminal that implements "try" and the management terminal that manages sales information are used have been described in the embodiments described above, the embodiments are not limited thereto, and histories of terminals using various O2O related technologies can be used such as the history of a terminal implementing "search" that is searching for related product information according to attributes of a product over which "focus" is performed.

Furthermore, in the embodiments described above, the analyzing unit 35 need not necessarily analyze ail the histories. That is, the analyzing unit 35 may set any of the weights to 0.

Figure 18:
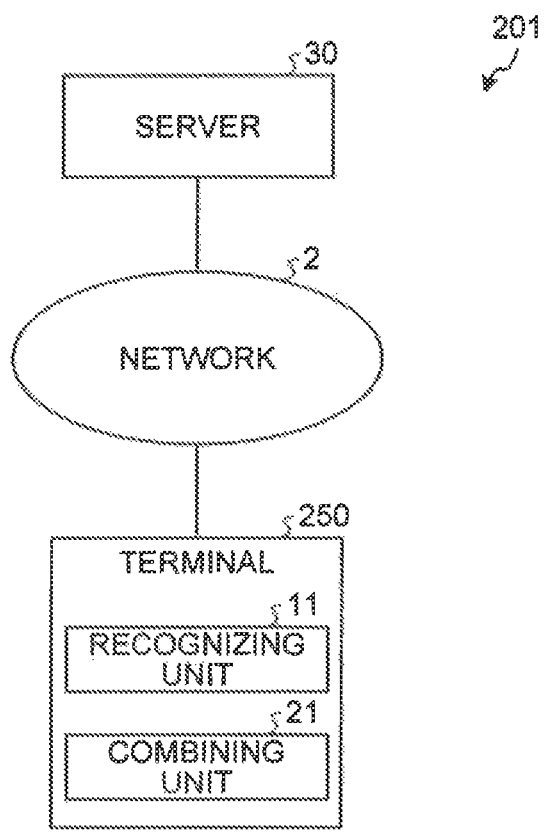
FIG. 18 is a diagram illustrating an example of a system according to a modification.

Furthermore, while examples in which the first terminal 10 including the recognizing unit 11 and the second terminal 20 including the combining unit 21 are different terminals have been described in the embodiments described above, the recognizing unit 11 and the combining unit 21 may be included in one terminal 250 as in a system 201 illustrated in FIG. 18.

Hardware Configuration

Figure 19:
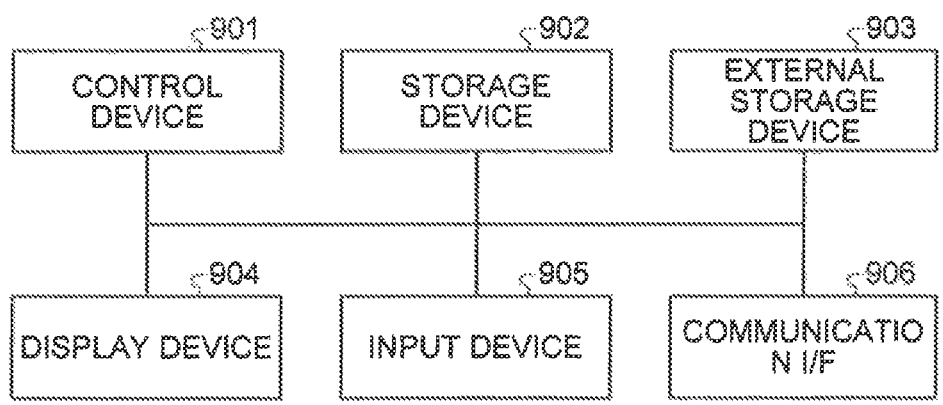
FIG. 19 is a diagram illustrating an example of a hardware configuration of the server according to the embodiments and modifications.

FIG. 19 is a diagram illustrating an example of a hardware configuration of the server according to the embodiments and modifications. The server according to the embodiments and modifications described above includes a control device 901 such as a CPU, a storage device 902 such as a ROM and a RAM, an external storage device 903 such as a HDD, a display device 904 such as a display, an input device 905 such as a keyboard and a mouse, and a communication device 906 such as a communication interface (I/F), which is a hardware configuration utilizing a common computer system.

Programs to be executed by the server according to the embodiments and modifications described above are recorded on a computer readable recording medium such as a CD-ROM, a CD-R, a memory card, a digital versatile disk (DVD) and a flexible disk (FD) in a form of a file that can be installed or executed, and provided therefrom as a computer program product.

Alternatively, the programs to be executed by the server according to the embodiments and modifications may be stored on a computer system connected to a network such as the Internet, and provided by being downloaded via the network. Still alternatively, the programs to be executed by the server according to the embodiments and modifications may be provided or distributed through a network such as the Internet. Still alternatively, the programs to be executed by the server according to the embodiments and modifications may be embedded in a ROM or the like in advance and provided therefrom.

The programs to be executed by the server according to the embodiments and modifications have modular structures for implementing the units described above on a computer system. In an actual hardware configuration, the CPU reads programs from the HDD and executes the programs on the RAM, whereby the respective units described above are implemented on a computer system.

For example, the order in which the steps in the flowcharts in the embodiments described above are performed may be changed, a plurality of steps may be performed at the same time or the order in which the steps are performed may be changed each time the steps are performed to the extent that the changes are not inconsistent with the nature thereof.

As described above, according to the embodiments and modifications described above, information with high probability of motivating the user to buy a product can be extracted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for virtual fitting comprising:
a first handheld terminal comprising:
a first processor,
a first imager coupled to the first processor,
a first display device coupled to the first processor; and
a first output card;
a second terminal installed in a store comprising:
a second processor,
a second imager coupled to the second processor, and
a second display device coupled to the second processor, and
a server for providing virtual fitting information comprising:
a third processor;
a recognition information storage configured to store a plurality of pieces of the recognition information output from the first terminal, and
a combination information storage configured to store a plurality of pieces of the combination information output from the second terminal;
wherein the first processor is configured to:
capture an image using the first imager;
recognize a first product image from the captured image by identifying at least one of a product identification or a plurality of attributes from the captured image;
estimate a product included in the first product image and acquire, from the server, first product information including product identification information identifying the product estimated from the first product image and including a plurality of kinds of related information relating to the product estimated from the first product image, at least one of the plurality of kinds of related information being store information of the store in which the product estimated from the first product image is sold and the second terminal is installed; and
per recognizing, output to the server recognition information including the product identification information of the estimated product estimated from the first product image and a date and time when the recognition information is generated;
wherein the second processor is configured to:
acquire, from the server, second product information of each of a plurality of products, the second product information including product identification information identifying each of the plurality of products and second product images for each of the plurality of products;
receive from the second display device a second product image selected by the user, the second product image being included in the second product information;
capture an object image that images the user using the second imager;
combine, among a plurality of pieces of second product information, the second product image with the object image; and
per combining, output to the server combination information including the product identification information included in the second product information used for the combining and a date and time when the combination information is generated;
wherein the third processor is configured to:
calculate product priorities for the plurality of products based on a first product priority and a second product priority of each product, the first product priority being calculated per product by analyzing the stored pieces of recognition information, the second product priority being calculated per product by analyzing the stored pieces of combination information;
set a higher value in calculating the first product priority of a product represented by product identification information associated with recognition information generated at a date and time closer to a current date and time;
set a higher value in calculating the second product priority of a product represented by product identification information associated with combination information generated at a date and time closer to a current date and time;
generate recommendation information recommending the store information when a product priority of the product estimated by the first terminal satisfies a first predetermined condition and the product identification information of the product estimated by the first terminal is not included in the pieces of combination information stored in the combination information storage; and
output the recommendation information to the first terminal; and
wherein, on the basis of the recommendation information output from the server, the first processor is configured to:
select the store information from among the plurality of kinds of related information; and
display the store information using the first display device.

2. The system according to claim 1, wherein the third processor is further configured to:
set a higher value to the first product priority of a product represented by the product identification information when the number of the pieces of product identification information having a same value in the recognition information storage is larger; and
set a higher value to the second product priority of a product represented by the product identification information when the number of the pieces of product identification information having in the same combination information storage is larger.

3. A system for virtual fitting comprising:
a first handheld terminal comprising:
a first processor, a first imager coupled to the first processor,
a first display device coupled to the first processor; and
a first output card;
a second terminal installed in a store comprising:
a second processor;
a second imager coupled to the second processor;
and a second display device coupled to the second processor; and
a server for providing virtual fitting information comprising:
a third processor;
a recognition information storage configured to store a plurality of pieces of the recognition information output from the first terminal; and
a combination information storage configured to store a plurality of pieces of the combination information output from the second terminal;
wherein the first processor is configured to:
capture an image using the first imager;
recognize a first product image from the captured image by identifying at least one of a product identification or a plurality of attributes from the captured image;
estimate a product included in the first product image and acquire, from the server, first product information including product identification information identifying the product estimated from the first product image and including a plurality of kinds of related information relating to the product estimated from the first product image, at least one of the plurality of kinds of related information being information of the store in which the product estimated from the first product image is sold and the second terminal is installed; and
per recognizing, output to the server recognition information including the product identification information of the estimated product, estimated from the first product image and a date and time when the recognition information is generated;
wherein the second processor is configured to:
acquire, from the server, second product information of each of a plurality of products, the second product information including product identification information identifying each of the plurality of products and second product images for each of the plurality of products;
receive from the second display device a second product image selected by the user, the second product image being included in the second product information;
capture an object image that images the user using the second imager;
combine, among a plurality of pieces of second product information, the second product image with the object image; and
per combining, output to the server combination information including the product identification information included in the second product information used for the combining and a date and time when the combination information is generated;
wherein the third processor is configured to:
acquire sales promotion information and purchase information associated with the plurality of products, the purchase information including product identification information and a date and time when the purchase information is generated;
store the sales promotion information and purchase information in the sales information storage;
calculate product priorities for the plurality of products based on a first product priority, a second product priority, a third product priority of each product, the first product priority being calculated per product by analyzing the stored pieces of recognition information, the second product priority being calculated per product by analyzing the stored pieces of combination information, and the third product priority being calculated per product by analyzing the stored pieces of purchase information;
set a higher value in calculating the first product priority of a product represented by product identification information associated with recognition information generated at a date and time closer to a current date and time;
set a higher value in calculating the second product priority of a product represented by product identification information associated with combination information generated at a date and time closer to a current date and time;
set a higher value in calculating the third product priority of a product represented by product identification information associated with purchase information generated at a date and time closer to a current date and time;
generate recommendation information recommending the store information and obtain information for updating the stored sales promotion information by analyzing information including the stored purchase information when a product priority of the product estimated by the first terminal satisfies a first predetermined condition and the product identification information of the product estimated by the first terminal is not included in the pieces of combination information stored in the combination information storage; and
output the recommendation information to the first terminal and the information for updating the stored sales promotion information to the third terminal, wherein on the basis of the recommendation information output from the server, the processing circuitry of the first terminal selects the store information from among the plurality of kinds of related information and displays the store information.

4. The system according to claim 3, wherein the third processor is further configured to:
set a higher value to the first product priority of a product represented by the product identification information when the number of the pieces of product identification information having a same value in the recognition information storage is larger;
set a higher value to the second product priority of a product represented by the product identification information as the number of the pieces of product identification information having a same combination information storage is larger; and
set a higher value to the third product priority of a product represented by the product identification information as the number of the pieces of product identification information having a same in the sales information storage is larger.

5. The system according to claim 3, wherein
the acquired recognition information further includes information associated with the product images;

the acquired sales promotion information further includes information associated with a sales promotion that includes at least one of the product images; and the sales promotion information is updated when a number of purchases of a product corresponding to the at least one of the product images satisfies a predetermined condition, the updated information obtained by analyzing the purchase information and a number of product images associated with the product included in the stored recognition information.

6. The system according to claim 3, wherein:

the acquired combination information further includes information associated with a product image and an object image included in a combination;

the acquired sales promotion information further includes information associated with a sales promotion that includes the combination; and the sales promotion information is updated when a product corresponding to the product image included in the combination is associated with a number of purchases that satisfies a predetermined condition, the updated information being obtained by analyzing the purchase information and combination information associated with the combination.

7. A method for a virtual fitting system comprising a first handheld terminal, a second terminal installed in a store, and a server for providing virtual fitting information, the method comprising:

by the first terminal:
capturing an image using a first imager;
recognizing a first product image from the captured image by identifying at least one of a product identification or a plurality of attributes from the captured image;
estimating a product included in the first product image;
acquiring, from the server, first product information including product identification information identifying the product estimated from the first product image and including a plurality of kinds of related information relating associated with the product estimated from the first product image, at least one of the plurality of kinds of related information being store information of the store in which the product estimated from the first product image is sold and the second terminal is installed; and
per recognizing, outputting to the server, recognition information including the product identification information of the estimated product, estimated from the first product image and a date and time when the recognition information is generated;

by the second terminal:
acquiring, from the server, second product information of each of a plurality of products, the second product information including product identification information identifying each of the plurality of products and second product images for each of the plurality of products;
receiving from a display device a second product image selected by the user, the second product image being included in the second product information;
capturing an object image that images the user using a second imager;
combining, among a plurality of pieces of second product information, the second product image with the object image; and
per combining, outputting to the server combination information including the product identification information included in the second product information used for the combining and a date and time when the combination information is generated; and by the server:
storing a plurality of pieces of the recognition information output from the first terminal in a recognition information storage;
storing a plurality of pieces of the combination information output from the second terminal in a combination information storage;
calculating product priorities for the plurality of products based on a first product priority and a second product priority of each product, the first product priority being calculated per product by analyzing the stored pieces of recognition information, the second product priority being calculated per product by analyzing the stored pieces of combination information;
setting a higher value in calculating the first product priority of a product represented by product identification information associated with recognition information generated at a date and time closer to a current date and time;
setting a higher value in calculating the second product priority of a product represented by product identification information associated with combination information generated at a date and time closer to a current date and time;
generating recommendation information recommending the store information when a product priority of the product estimated by the first terminal satisfies a first predetermined condition and the product identification information of the product estimated by the first terminal is not included in the pieces of combination information stored in the combination information storage; and
outputting, based the recommendation information to the first terminal; and by the first terminal on the basis of the recommendation information output from the server, selecting the store information from among the plurality of kinds of related information and displaying the store information.

8. The method of claim 7, wherein the method further comprises:

by the server:
setting a higher value to the first product priority of a product represented by the product identification information when the number of the pieces of product identification information having a same value in the recognition information storage is larger; and
setting a higher value to the second product priority of a product represented by the product identification information when the number of the pieces of product identification information having in the same combination information storage is larger.

9. The system of claim 1, wherein
the first imager comprises a first digital camera;
the first output card comprises a network interface card (NIC); and
the first display device comprises at least one of a liquid crystal display or a touch panel display.

10. The system of claim 9, wherein
the second imager comprises a second digital camera; and
the second display device comprises at least one of a liquid crystal display or a touch panel display.

11. The system of claim 10, wherein
the first display device comprises a liquid crystal display; and
the second display comprises a touch panel.

12. The system of claim 1, wherein
the plurality of attributes comprise brand, color, and material; and
the captured image comprises an advertising image of the estimated product.

13. The system of claim 1, wherein the recognition information storage comprises at least one of a hard disk drive, a solid state drive, a memory card, an optical disk, or a random access memory; and the combination information storage comprises at least one of a hard disk drive, a solid state drive, a memory card, an optical disk, or a random access memory.

14. The system of claim 13, wherein
the recognition information storage comprises a solid state drive; and
the combination information storage comprises a hard disk drive.

15. The system of claim 1, wherein the first output card is coupled to the first display device and the first processor.

16. The system of claim 15, wherein the second terminal further comprises a network interface card (NIC) coupled to the second processor and the second display device.

17. The system of claim 1, wherein
the first terminal further comprises at least one hard drive coupled to the first processor and storing feedback information; and
the second terminal further comprises at least one hard drive coupled to the second processor and storing feedback information.

18. The system of claim 1, wherein the third processor is coupled in parallel with the recognition information storage and the combination information storage.

19. The system of claim 18, wherein the server further comprises:
a hard drive storing the second product information; and
a network interface card (NIC) coupled to the third processor and the hard drive.

20. The system of claim 19, wherein the hard drive stores the second product information in a data structure comprising product identification, attribute information, accompanying information, and a group of images.

* * * * *